United States Patent
Cho et al.

(10) Patent No.: US 9,679,127 B2
(45) Date of Patent: Jun. 13, 2017

(54) METHOD AND APPARATUS FOR DETECTING ACCESSORIES IN ELECTRONIC DEVICES

(71) Applicant: Samsung Electronics Co., Ltd., Gyeonggi-do (KR)

(72) Inventors: Sehyun Cho, Gyeonggi-do (KR); Dongil Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 15 days.

(21) Appl. No.: 14/313,116

(22) Filed: Jun. 24, 2014

(65) Prior Publication Data

US 2014/0375419 A1    Dec. 25, 2014

(30) Foreign Application Priority Data

Jun. 25, 2013    (KR) ........................ 10-2013-0073141

(51) Int. Cl.
  *G06F 21/44*    (2013.01)
  *H04M 1/60*    (2006.01)
  *G06F 13/40*    (2006.01)

(52) U.S. Cl.
  CPC .......... *G06F 21/44* (2013.01); *G06F 13/4063* (2013.01); *H04M 1/6058* (2013.01)

(58) Field of Classification Search
  CPC ..... G06F 13/4063; G06F 21/44; H03G 3/001; H04M 1/6058; H04M 1/72527; H04M 2250/02
  USPC ............................. 340/5.8, 10.42; 710/15, 16
  See application file for complete search history.

(56) References Cited

U.S. PATENT DOCUMENTS

| | | | |
|---|---|---|---|
| 2004/0116005 A1* | 6/2004 | Choi | H03G 3/001 439/894 |
| 2005/0268000 A1 | 12/2005 | Carlson | |
| 2006/0004930 A1* | 1/2006 | Patino | G06F 13/4081 710/16 |
| 2008/0164994 A1 | 7/2008 | Johnson et al. | |
| 2009/0091422 A1* | 4/2009 | Minoo | G06F 13/4282 340/5.8 |
| 2010/0057473 A1* | 3/2010 | Kong | G10L 19/18 704/500 |
| 2010/0117685 A1* | 5/2010 | Kong | G06F 13/4072 327/74 |
| 2011/0205092 A1* | 8/2011 | Kuroda | G01C 19/5776 341/118 |
| 2012/0051562 A1* | 3/2012 | Kim | H04R 3/00 381/122 |
| 2012/0249119 A1* | 10/2012 | Wada | G06F 13/4081 324/71.1 |

(Continued)

FOREIGN PATENT DOCUMENTS

| | | |
|---|---|---|
| EP | 1 912 125 A1 | 4/2008 |
| KR | 10-2005-0005315 A | 1/2005 |

*Primary Examiner* — Thomas Alunkal
(74) *Attorney, Agent, or Firm* — Cha & Reiter, LLC.

(57) ABSTRACT

A method and an apparatus for detecting an accessory in an electronic device. A connection of accessory with an interface unit is detected. An analog signal in a predetermined frequency is generated. The generated analog signal is applied to an identification terminal of the interface unit. The applied analog signal is converted to a digital signal and the type of the accessory is identified based on the converted digital signal.

19 Claims, 6 Drawing Sheets

(56) References Cited

U.S. PATENT DOCUMENTS

2012/0257768 A1* 10/2012 Park .................. H04M 1/6058
381/94.5

* cited by examiner

METHOD AND APPARATUS FOR DETECTING ACCESSORIES IN ELECTRONIC DEVICES

CROSS-REFERENCE TO RELATED APPLICATION

This application claims priority from and the benefit under 35 U.S.C. §119(a) of Korean Patent Application No. 10-2013-0073141, filed on Jun. 25, 2013, which is hereby incorporated by reference herein.

BACKGROUND

1. Field

The present disclosure relates generally to a method and an apparatus for detecting an accessory, and more particularly, to a method and apparatus for identifying a type of accessory connected to an electronic device.

2. Description of Related Art

Due to recent remarkable developments in communication and semiconductors, the use of electronic devices has spread rapidly across the globe. Furthermore, electronic devices now provide many more functions than before. For example, in addition to general communication (e.g., phone calls or text messaging) electronic devices today may provide multimedia, such as television {e.g., mobile broadcasting such as Digital Multimedia Broadcasting (DMB) or Digital Video Broadcasting (DVB)}, music {e.g., MPEG Audio Layer-3 (MP3)}, and movies.

Furthermore, electronic devices may also be used with accessories (a triple-pole earphone, a quadru-pole earphone, an auxiliary speaker etc.) by using an interface unit (e.g., an ear jack).

SUMMARY

An electronic device may apply a direct current (DC) of a constant voltage to an accessory's identification terminal, and may measure an output voltage of the identification terminal when connection of an accessory is detected. This may permit the electronic device to identify the type of accessory connected. Identifying an accessory using the change in DC voltage, may incur a chattering phenomenon and a bounce phenomenon when the accessory is connected. In addition, the electronic device may detect the wrong type of accessory due to noise, when measuring the output voltage. Also, even with the same type of accessories, the output voltage may be different due to poor product quality, which may cause the electronic device to also detect the wrong type of accessory.

In view of the foregoing, aspects of the present disclosure provide a method and an apparatus for identifying an accessory in an electronic device such that erroneous accessory identification is prevented.

In accordance with one aspect of the present disclosure, an apparatus for detecting an accessory in an electronic device is provided. The apparatus may include: an interface unit to connect with the accessory; a controller to: detect a connection with the accessory; generate an analog signal in a predetermined frequency and apply the generated analog signal to an identification terminal of the interface unit in response to detection of the connection with the accessory; convert the applied analog signal to a digital signal; and identify a type of the accessory based on the converted digital signal.

In accordance with another aspect of the present disclosure, a method for detecting an accessory in an electronic device is provided. The method may include detecting a connection of the accessory with an interface unit; generating an analog signal in a predetermined frequency and applying the generated analog signal to an identification terminal of the interface unit in response to detection of the connection with the accessory; converting the applied analog signal to a digital signal; and identifying a type of the accessory based on the converted digital signal.

A method and an apparatus for detecting an accessory in an electronic device in accordance with aspects of the present disclosure can prevent mistaken recognition of the accessory connected with an interface unit of the electronic device.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
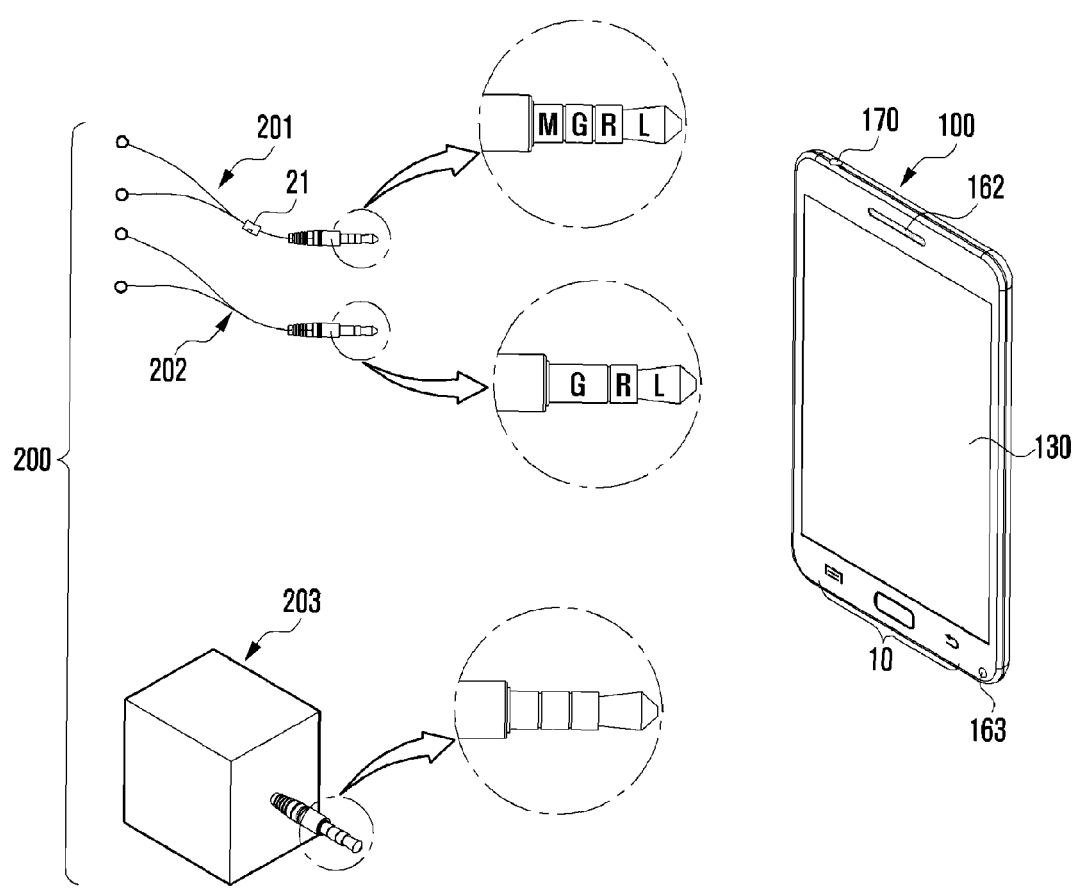
FIG. 1 illustrates an example electronic device and an example accessory in accordance with aspects of the present disclosure.

Hereinafter, examples of the present disclosure will be described in detail with reference to the accompanying drawings. It should be noted that the same elements will be designated by the same reference numerals although they are shown in different drawings. Furthermore, in the following description of the present disclosure, a detailed description of known functions and configurations incorporated herein will be omitted when it may make the subject matter of the present disclosure unclear.

The examples disclosed in the specification and drawings are merely presented to describe technical contents and make the techniques herein understandable to one of ordinary skill in the art. Thus, the examples herein are not intended to limit the scope of the present disclosure. The examples disclosed herein may be modified without departing from the spirit and scope of the present disclosure.

Electronic devices in accordance with aspects of the present disclosure may connect with an accessory using an interface unit, and may include mobile communication devices, Personal Digital Assistants (PDAs), smart phones, Tablet PCs, Portable Multimedia Players (PMPs), etc. In one example, an accessory may be defined as an auxiliary device that is connected with an interface unit (e.g., an ear jack) or a Universal Serial Bus (USB) of the electronic device.

Referring to FIG. 1, an example electronic device and an example accessory is illustrated. Electronic device 100 may include a display unit 130 for displaying image data, a speaker 162 for an output of an audio signal, a plurality of keys 10, and a microphone 163 for collecting an audio signal. In addition, the electronic device 100 may include an interface unit 170 for a connection of an accessory 200. The accessory 200 may include a quadru-pole earphone 201, a triple-pole earphone 202, an auxiliary speaker 203, or the like. The interface unit 170 may be an ear jack 170. However, the interface unit 170 is not limited to the ear jack. For example, the interface unit 170 may be formed with a Universal Serial Bus (USB) connector, a micro-USB connector, a ten-pole connector, and a twenty-pole connector.

When accessory 200 is connected to interface unit 170, the electronic device 100 may detect the connection of the accessory 200 using a detecting unit (not shown). In turn, this may activate a signal generating unit (not shown). The signal generating unit may generate an analog signal of a predetermined frequency f0 (e.g., an analog signal of 10 MHz) and apply the generated analog signal to an identification terminal of the interface unit 170. The analog signal may be an alternating current (AC) signal.

The electronic device 100 may convert the analog signal applied to the identification terminal to a digital signal, and identify the type of the accessory based on the converted digital signal. The examples of the present disclosure may prevent erroneous identification of an accessory because it is not influenced by noise. Further, the example of the present disclosure can prevent mistaken identification due to a chattering phenomenon and a bounce phenomenon that may be generated when connecting the accessory 200.

Meanwhile, when identification of the accessory is completed, the electronic device 100 may automatically perform a function corresponding to the type of the identified accessory. For example, when a quadru-pole earphone 201 or a triple-pole earphone 202 is identified, the electronic device 100 may control an audio signal to be output through the quadru-pole earphone 201 or the triple-pole earphone 202. In addition, upon connection of the quadru-pole earphone 201, electronic device 100 may control the path of the microphone so that the microphone 163 of the electronic device 100 is deactivated, and an audio signal is received by a microphone 21 of the quadru-pole earphone 201. On the contrary, with the recognition of the connection of the triple-pole earphone 202, the electronic device 100 may control the path of the microphone so that the audio signal is received by the microphone 163 of the electronic device 100.

Figure 2:
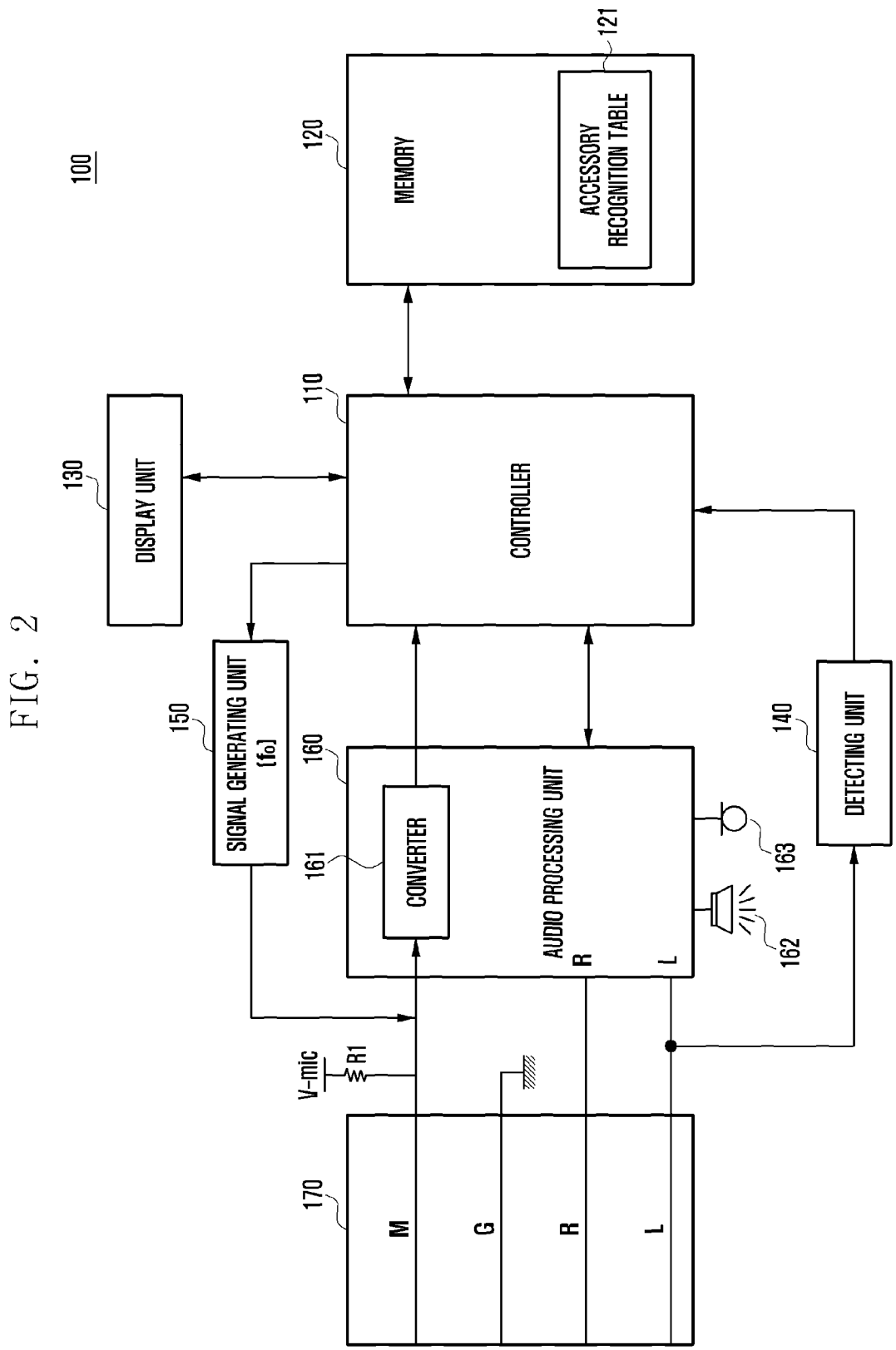
FIG. 2 is a block diagram illustrating an example configuration of an electronic device in accordance with aspects of the present disclosure.

FIG. 2 is a block diagram illustrating an example configuration of an electronic device in accordance with aspects of the present disclosure. One working example using an ear jack will be described. Referring to FIGS. 1 and 2, an electronic device 100 may include a controller 110, a memory 120, a display unit 130, a detecting unit 140, a signal generating unit 150, an audio processing unit 160, and an interface unit 170. The memory 120 may include an accessory identification table 121, and the audio processing unit 160 may include a converter 161.

An accessory 200 may connect to the electronic device 100 via interface unit 170. As noted above, the interface unit 170 may be an ear jack. The interface unit 170 may include a microphone terminal M, a grounding terminal G, a right audio signal terminal R, and a left audio signal terminal L. The microphone terminal M may be connected with a bias power source V_mic, the converter 161, and the signal generating unit 150. This microphone terminal M may be used as an identification terminal to identify the type of accessory 200. The grounding terminal G may be grounded. The right audio signal terminal R and the left audio signal terminal L may be connected with the audio processing unit 160.

The audio processing unit 160 may receive an audio signal and perform encoding and decoding thereof. In order to do so, the audio processing unit 160 may include a codec and an audio amplifier. The audio processing unit 160 may be connected with the speaker 162 and the microphone 163. For example, the audio processing unit 160 may convert a digital audio signal input from controller 110 to an analog audio signal. The analog audio signal may be output using speaker 162 or the accessory 200. Alternatively, the audio processing unit 160 may output various audio signals (e.g., audio signals resulting from the reproduction of MP3 files and movie files) which are generated in the electronic device 100 by means of the speaker 162 or the accessory 200.

When the connection of the accessory 200 is detected, the audio processing unit 160 may output an effect sound by the speaker 162 to indicate that accessory 200 is connected. Furthermore, the audio processing unit 160 may change the path of an audio signal depending on the connection of the accessory 200. For example, the audio processing unit 160 may change the path of an audio signal so that when the accessory 200 is not connected, the audio processing unit 160 outputs an audio signal by the speaker 162 under the control of the controller 110. However, assuming that accessory 200 is a speaker, when accessory 200 is connected, the audio processing unit 160 may output an audio signal through the speaker of accessory 200. In addition, the audio processing unit 160 may change the path of an audio signal so that when the accessory 200 is not connected or an accessory (e.g., a triple-pole earphone) not having a microphone is connected, the audio processing unit 160 collects audio signals by means of the microphone 163 under the control of the controller 110. On the contrary, the audio processing unit 160 may change the path of an audio signal so that when an accessory (e.g., a quadru-pole earphone) having a microphone is connected, the audio processing unit 160 collects audio signals by means of the microphone of the accessory under the control of the controller 110.

The audio processing unit 160 may include a converter 161. The converter 161 may be an Analog-Digital Converter (ADC) by which analog signals may be converted to digital signals. The converter 161 may be connected with the microphone terminal M of the interface unit 170 to convert an analog signal input from the microphone terminal M of the interface unit 170 to a digital signal, and transmit the converted digital signal to the controller 110. The digital signal transmitted to the controller 110 may be used for identifying the type of accessory 200. Furthermore, the converter 161 may convert an analog signal input from the microphone 163 of the audio processing unit 160 or the microphone 21 of the quadru-pole earphone 201 to a digital signal that will be forwarded to controller 110. Therefore, rather than arranging a converter for converting a signal of the microphone and another converter for identifying the type of accessory, the examples of the present disclosure may utilize a single converter for identifying the type of accessory and for converting the microphone signal. Using a single converter can save costs in manufacturing the electronic device 100.

Although converter 161 is included in the audio processing unit 160 in FIG. 2, the example of the present disclosure is not limited to this example. In another example, converter 161 may be provided separately or in another element (e.g., a controller 110) of electronic device 100.

The detecting unit 140 may detect a connection of the accessory 200. The detecting unit 140 may be connected with the left audio signal terminal L of the interface unit 170. The detecting unit 140 may be implemented by a comparator. For example, the comparator may compare an output voltage of the left audio signal terminal L with a preset reference voltage. A detection signal may be detected in accordance with the result of comparing the output voltage with the preset reference voltage. Specifically, the comparator may be configured to output a low signal (e.g., 0V) when the accessory 200 is not connected, and a high signal (e.g., 5V) when the accessory 200 is connected. Conversely, the comparator may be configured to output a high signal when the accessory 200 is not connected, and a low signal when the accessory 200 is connected. The output signal of the detecting unit 140 may be transmitted to the controller 110.

Although the detecting unit 140 detects the connection of the accessory 200 by using the left audio signal terminal L as described above, the example of the present disclosure is not limited to this example. In another example, the detecting unit 140 may detect the connection of the accessory 200 by using ground terminal G of interface unit 170. Alternatively, interface unit 170 may separately include a detection terminal (not shown) for detecting the connection of accessory 200.

Signal generating unit 150 may be activated to generate an analog signal of a predetermined frequency f0 when the accessory 200 is connected. The analog signal may be an alternating current (AC) signal. For example, the signal generating unit 150 may generate an analog signal of 10 MHz. The signal of the predetermined frequency f0 may be applied to the microphone terminal M to be thereby input to the converter 161.

The display unit 130 may display various menus of electronic device 100, information input by the user, or information to be provided to the user. The display unit 130 may be formed with a Liquid Crystal Display (LCD), an Organic Light Emitted Diode (OLED), and an Active Matrix Organic Light Emitted Diode (AMOLED). When the display unit 130 adopts a touch screen, the display unit 130 may perform a display function and an input function.

The display unit 130 may provide various images, for example, a home image, a menu image, a web page image, and a phone call image, based on a use of the electronic device 100. In addition, display unit 130 may display an icon representing the type of connected accessory. For example, display unit 130 may display the icon representing the type of accessory in an indicator area where the battery percentage and the signal intensity are displayed.

The memory 120 may store an Operating System (OS), application programs required for other optional functions, for example, a voice reproduction function, an image or movie reproduction function, and a broadcast reproduction function, user data, and transmitted and received data of communication (e.g., a text message, game files, music files, movie files and contact information). For example, the memory 120 may store an application to detect the connection of accessory 200 and to identify the type of the connected accessory 200.

In addition, memory 120 may store an accessory identification table 121 for identifying the type of accessory 200. The accessory identification table 121 may associate predetermined digital signals with predetermined accessories. For example, the accessory identification table 121 may be the following Table 1.

TABLE 1

| Digital Signal | Accessories |
| --- | --- |
| 000000 | Triple-pole earphone |
| 101010 | Quadru-pole earphone |
| 10101010 | Auxiliary speaker |
| . | . |
| . | . |
| . | . |

Referring to the Table 1, a digital signal "000000" is associated with a triple-pole earphone 202, and a digital signal "101010" is associated with a quadru-pole earphone 201. Also, a digital signal "10101010" is associated with an auxiliary speaker 203. However, it is understood that Table 1 is merely an example such that other associations may be made with different digital signals and different accessories. Accessory identification table 121 may be modified in various ways in accordance with a manufacturer's design. For example, if signal generating unit that generates a frequency (e.g., f1) distinct from frequency f0 is connected with the microphone terminal of the accessory, the accessory identification table 121 may associate a digital signal according to the frequency f1 of the signal generation unit with predetermined accessories. Alternatively, when a resistor R, an inductor L, a capacitor C or the like (hereinafter, referred to as "frequency changing elements") are connected with the microphone terminal of the accessory such that frequency f0 is changed, the accessory identification table 121 may associate a digital signal according to the changed frequency caused by the frequency changing elements with the corresponding accessory.

The controller 110 may control overall operations of the electronic device 100 and a signal flow between internal blocks of the electronic device 100, and may perform a data processing function for processing data. For example, the controller 110 may control the process of detecting the accessory using digital signals. The controller 110 may detect the connection of the accessory 200 with the interface unit 170 through detecting unit 140. When the connection of the accessory 200 is detected, the controller 110 may activate the signal generating unit 150 to apply an analog signal of a predetermined frequency f0 to the microphone terminal M. The analog signal applied to the microphone terminal M may be converted to a digital signal by the converter 161. In turn, this digital signal may be transmitted to controller 110. The controller 110 may identify the type of the connected accessory through the converted digital signal. In another example, the controller 110 may search the accessory identification table 121 to identify whether the converted digital signal exists in the accessory identification table 121. When the converted digital signal exists in the accessory identification table 121, the controller 110 may determine that an accessory associated with the converted digital signal is connected. The controller 110 may check the digital signal at a predetermined intervals (e.g., three times the cycle of the predetermined frequency). By way of example, if the converted digital signal is "101010," controller 110 may identify the accessory as quadru-pole earphone 201; if the converted digital signal is "000000," controller 110 may identify the accessory as a triple-pole earphone 202; finally, if the converted digital signal is "10101010," controller 110 may identify the accessory as auxiliary speaker 203.

Although not shown in FIG. 2, the electronic device 100 may selectively include elements having additional functions such as a camera module for taking pictures or movies, a local area network module for local area communication, a broadcast receiving module for receiving a broadcast, and an Internet communication module for performing an Internet function. While all the possible structural elements cannot be listed, the electronic device 100 may further include more or less components than those listed herein.

An example method for detecting the accessory will now be described in detail with reference to FIGS. 3 and 4.

Figure 3A:
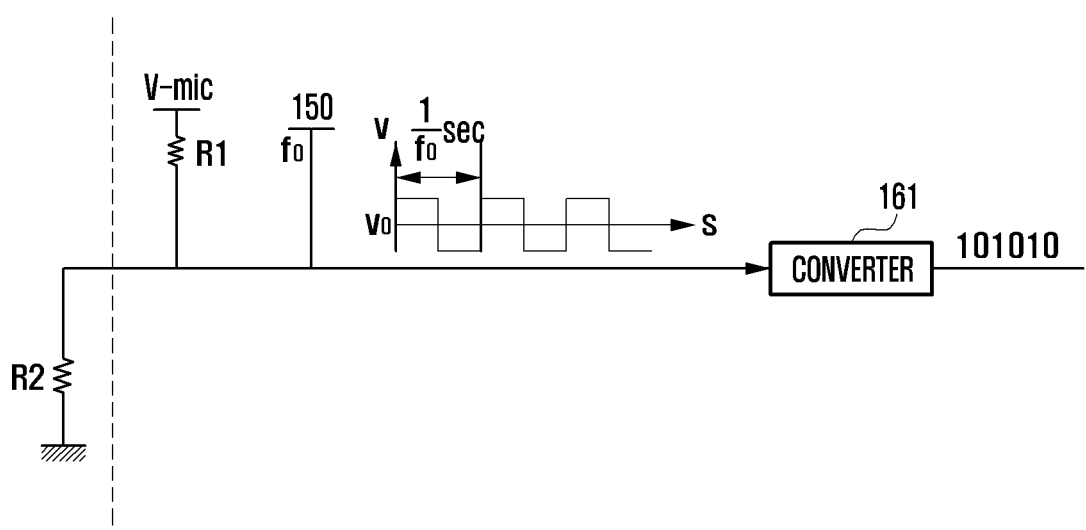
FIG. 3A illustrates a working example of a circuit in accordance with aspects of the present disclosure.
Figure 3B:
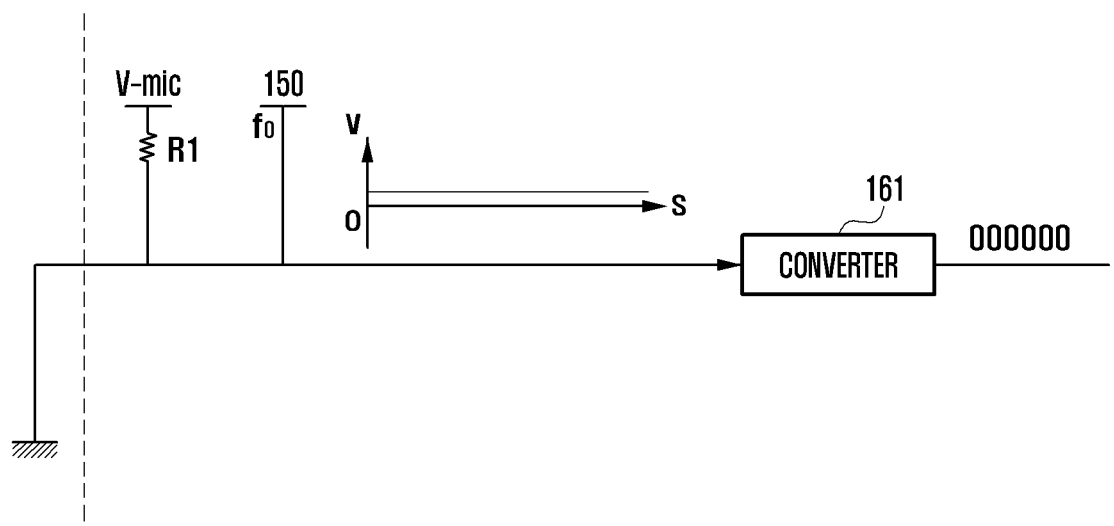
FIG. 3B illustrates a further example of a circuit in accordance with aspects of the present disclosure.
Figure 3C:
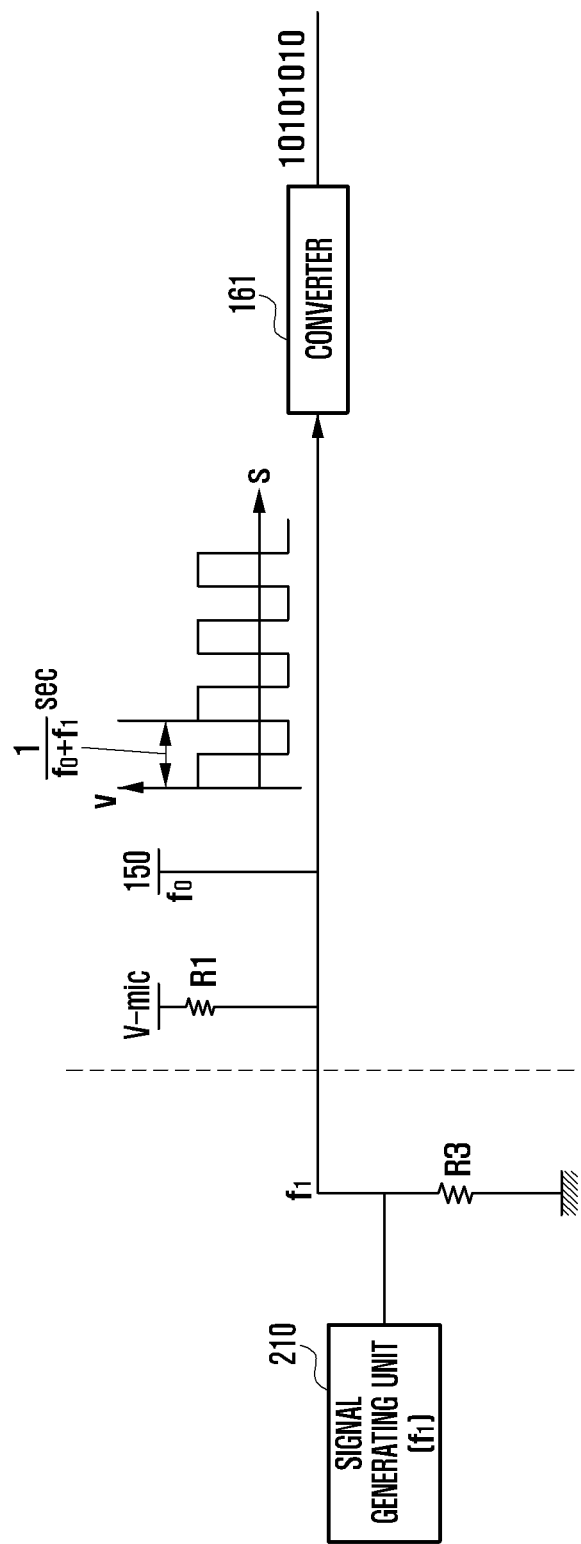
FIG. 3C illustrates an yet another working example in accordance with aspects of the present disclosure.

FIG. 3A illustrates an example equivalent circuit, when a quadru-pole earphone is connected. FIG. 3B illustrates an example equivalent circuit, when a triple-pole earphone is connected, and FIG. 3C illustrates an example equivalent circuit when an auxiliary speaker is connected.

First, referring to FIG. 3A, when the quadru-pole earphone 201 is connected with the interface unit 170, the microphone terminal M may be applied with a bias voltage V_mic distributed at a ratio of a pull-up resistance R1 to a pull-down resistance R2 and an analog signal of a predetermined frequency f0. For example, an analog signal that is output from the microphone M and is input to the converter 161 may have the distributed bias voltage as a reference voltage V0 and a cycle of 1/f0 second. For example, if the bias voltage V-mic is 3.0V, the ratio of the pull-up resistance R1 to the pull-down resistance R2 is 2:1, and the predetermined frequency is 10 MHz, the analog signal applied to the converter 161 may have a reference voltage of 1V and a cycle of 100 nano-seconds. Afterwards, the converter 161 may convert the applied analog signal to the digital signal of "101010."

Next, referring to FIG. 3B, when the triple-pole earphone 202 is connected with the interface unit 170, a grounding signal may be applied to the microphone terminal M. This is because the microphone terminal M is grounded in the triple-pole earphone 202. When the grounding signal is applied to the converter 161 as above, the converter 161 may output the digital signal of "000000".

Finally, referring to FIG. 3C, when the auxiliary speaker 203 is connected with the interface unit 170, the microphone terminal M is applied with a bias voltage V_mic distributed at a ratio of a pull-up resistance R1 to a pull-down resistance R3, an analog signal of a predetermined frequency (f0, hereinafter referred to as a first frequency), and an analog signal of another frequency (f1, hereinafter referred to as a second frequency). The second frequency f1 may be generated by a signal generating unit 210 included in the auxiliary speaker 203. Hereinafter, the signal generating unit 150 included in the electronic device 100 and the signal generating unit 210 included in the accessory (e.g., the auxiliary speaker 203) are referred to as a first signal generating unit and a second signal generating unit, respectively.

The second signal generating unit 210 generates a second frequency f1 different from the first frequency f0 generated by the first signal generating unit 150 to be applied to the microphone terminal M. For example, an analog signal that is output from the microphone terminal M to the converter 161 may have the bias voltage distributed by the pull-up resistance R1 and the a pull-down resistance R3 as a reference voltage V1, and a cycle of 1/(f0+f1) seconds. For example, if the bias voltage V-mic is 3.0V, the ratio of the pull-up resistance R1 to the pull-down resistance R3 is 2:1, and the sum of the first frequency f0 and the second frequency f1 is 13 MHz, the analog signal input to the converter 161 may have a reference voltage of 1V and a cycle of 77 nano-seconds. The converter 161 may convert the applied analog signal to the digital signal of "10101010." As noted above, as the cycle of the analog signal decreases, the digital signal output from the converter 161 may increase from 6 bits to 8 bits.

Although the accessory is detected using the frequency of the second signal generating unit 210 in FIG. 3C, the present disclosure is not limited to this example. In another example, frequency changing elements (e.g., a resistor R, an inductor L, a capacitor C or elements corresponding to them), which are able to change the first frequency f0, are additionally connected in the microphone terminal of the auxiliary speaker 203 to change the frequency of the signal applied to the converter 161. Thus, in this alternative example, the type of the accessory connected with the interface unit 170 may be identified by the changed frequency.

Figure 4:
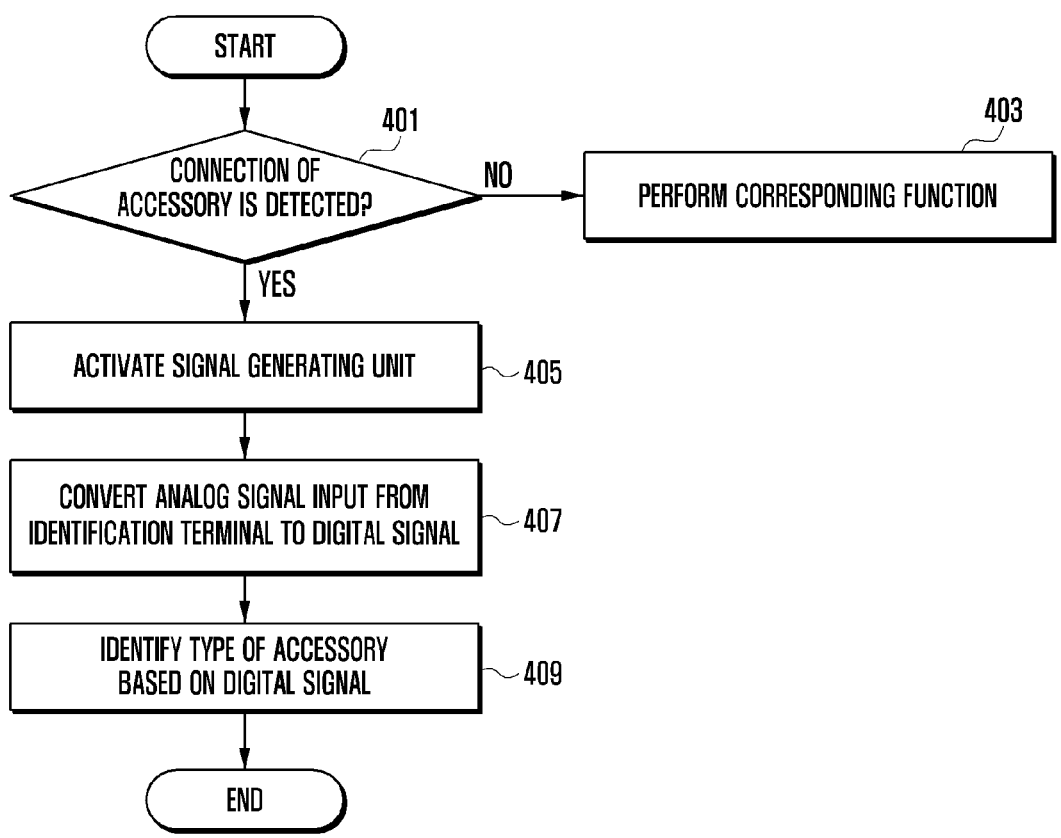
FIG. 4 is a flowchart illustrating an example method for identifying an accessory in accordance with aspects of the present disclosure.

FIG. 4 is a flowchart illustrating an example method for detecting an accessory of an electronic device in accordance with aspects of the present disclosure.

Referring to FIGS. 1 to 4, controller 110 may detect a connection with the accessory at block 401. The connection of the accessory may be detected using detecting unit 140. The method of detecting the connection of the accessory was described in detail above.

If the connection of the accessory is not detected at block 401, the controller 110 may perform a corresponding function at block 403. For example, the controller 110 may perform a music reproduction function, an Internet connection function, a movie reproduction function, and the like by a request of a user, or stay in a standby state.

When the connection of the accessory is detected at block 401, the controller 110 may activate the signal generating unit 150 at block 405. The signal generating unit 150 may generate an analog signal of a predetermined frequency f0, for example, 10 MHz, and apply the generated analog signal to an identification terminal (e.g., an microphone terminal) of the interface unit 170.

The converter 161 of electronic device 100 may convert the analog signal to a digital signal at block 407. The converted digital signal may be transmitted to the controller 110.

The controller 110 may identify the type of the accessory based on the converted digital signal at block 409. As noted above, controller 110 may search the accessory identification table 121 stored in the memory 120 to identify whether the converted digital signal exists in the accessory identification table 121 and identify the accessory associated with the converted digital signal, when the converted digital signal exists in the accessory identification table. By way of example, controller 110 may identify quadru-pole earphone 201, when the digital signal is "101010;" controller 110 may identify triple-pole earphone 202, when the digital signal is "000000;" and controller 110 may identify auxiliary speaker 203 when the digital signal is "10101010."

When the type of the connected accessory is identified, controller 110 may display an icon representing the detected accessory in some area (e.g., an indicator area) of the screen. In addition, controller 110 may change the path of an audio signal accordingly. For example, when the quadru-pole earphone 201 is connected, the controller 110 may change the path of the audio signal so that the audio signal is output to the quadru-pole earphone 201. Further, the controller 110 may change the path of the microphone so that the microphone 163 of the electronic device 100 is turned off, while an audio signal is received by the microphone 21 of the quadru-pole earphone 201.

Advantageously, the techniques for detecting an accessory of the electronic device disclosed herein may prevent erroneous identification of an accessory due to noise, chattering phenomenon, or bounce phenomenon. In this regard, the techniques disclosed herein may utilize digital signals converted from analog signals to identify the accessories. In addition, since the techniques herein do not have to adopt a debounce circuit for preventing the bounce phenomenon generated upon the connection of the accessory, the cost of manufacturing electronic device 100 can be reduced.

The above-described method for detecting the accessory of the electronic device in accordance with aspects of the present disclosure may be implemented in the form of program instructions which can be performed by various computing devices, and be recorded in a non-transitory computer-readable recording medium. The non-transitory computer-readable recording medium may include a program command, a data file, and a data structure alone or a combination thereof. Meanwhile, the program instructions recorded in the recording medium may be specially designed and configured for the example of the present disclosure, or be something known to those skilled in art. The non-transitory computer-readable recording medium may include magnetic media such as hard disks, floppy disks and magnetic tapes, optical media such as a Compact Disc Read-Only Memory (CD-ROM) and a Digital Versatile Disc (DVD), magneto-optical media such as optical disks, and hardware devices such as a Read-Only Memory (ROM), a Random Access Memory (RAM) and a flash memory, which are specially configured to store and perform program commands. Further, the program commands may include machine language code generated by a compiler and a high-level language code executable by a computer through an interpreter and the like. The hardware devices may be configured to operate as one or more software modules to perform the operations of the present disclosure.

No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se. Although the various examples of the present disclosure have been described with reference to the drawings using specific terminology, this is merely for aiding the explanation and understanding of the disclosure. It is understood that the scope of the present disclosure is not limited to the examples disclosed herein. That is, other various examples based on the techniques of the present disclosure can be implemented.

What is claimed is:

1. An apparatus for detecting an accessory in an electronic device comprising:
    an interface unit to connect with the accessory; and
    a controller configured to:
        detect a connection with the accessory;
        generate an analog signal having a predetermined frequency in response to detection of the connection with the accessory wherein the generated analog signal is applied to an identification terminal of the interface unit, wherein a frequency of the analog signal applied to the identification terminal is changed when input to the controller from the identification terminal, if the connected accessory is of a particular type;
        convert an analog signal input from the identification terminal to a digital signal, wherein a change in a frequency of the analog signal input from the identification terminal is corresponds to a particular type of the connected accessory; and
        identify the type of the connected accessory based on the digital signal.

2. The apparatus of claim 1, further comprising a memory to store an accessory identification table to associate predetermined accessories with digital signals.

3. The apparatus of claim 2, wherein the controller is further configured to:
    search the accessory identification table to identify whether the digital signal exists in the accessory identification table; and
    identify the accessory associated with the digital signal, when the digital signal exists in the accessory identification table.

4. The apparatus of claim 1, wherein the interface unit is an ear jack and the identification terminal is a microphone terminal.

5. The apparatus of claim 1, wherein the controller is further configured to use a comparator to detect the connection with the accessory.

6. The apparatus of claim 1, wherein the controller is further configured to use a display unit to display an icon representing the accessory.

7. The apparatus of claim 1, wherein the accessory further generates a different analog signal having a different frequency and apply the generated different analog signal to the identification terminal.

8. The apparatus of claim 1, wherein the accessory comprises a frequency changing element to change the predetermined frequency.

9. A method for detecting an accessory in an electronic device comprising:
    detecting a connection of the accessory with an interface unit;
    generating an analog signal having a predetermined frequency in response to detection of the connection with the accessory wherein the generated analog signal is applied to an identification terminal of the interface unit, wherein a frequency of the analog signal applied to the identification terminal is changed when output from the identification terminal, if the connected accessory is of a particular type;
    converting an analog signal input from the identification terminal to a digital signal, wherein a change in a frequency of the analog signal input from the identification terminal corresponds to a particular type of the connected accessory; and
    identifying the type of the connected accessory based on the digital signal.

10. The method of claim 9, wherein the identifying the type of the accessory comprises searching an accessory identification table that associates predetermined accessories with digital signals to identify whether the digital signal exists in the accessory identification table.

11. The method of claim 9, wherein the interface unit is an ear jack and the identification terminal is a microphone terminal.

12. The method of claim 9, wherein detecting the connection of the accessory comprises:
  comparing an output voltage of a detection terminal of the interface unit with a preset reference voltage; and
  detecting a detection signal output in accordance with a result of comparing the output voltage and the preset reference voltage.

13. The method of claim 9, further comprising displaying an icon representing the connected accessory.

14. The method of claim 9, further comprising generating, using a signal generating unit included in the accessory, a different analog signal in a different frequency, and applying the different analog signal generated in the accessory to the identification terminal.

15. The method of claim 9, further comprising changing, using a frequency changing element included in the accessory, the predetermined frequency.

16. An apparatus for detecting an accessory in an electronic device comprising:
  an interface unit to connect with the accessory;
  a bias voltage source to apply a bias voltage to an identification terminal of the interface unit; and
  a controller configured to:
    detect a connection with the accessory;
    generate an analog signal having a predetermined frequency and apply the generated analog signal to the identification terminal of the interface unit in response to detection of the connection with the accessory;
    convert an analog signal input from the identification terminal to a digital signal; and
    identify a type of the connected accessory based on the digital signal,
  wherein the accessory comprises one of:
    a signal generating unit to generate a different analog signal having a different frequency and apply the generated different analog signal to the identification terminal; and
    a frequency changing element to change the predetermined frequency,
  wherein a frequency of the analog signal applied to the identification terminal is changed when input to the controller from the identification terminal, if the connected accessory is of a particular type, and the analog signal input from the identification terminal is changed according to the type of the connected accessory in which a change in the predetermined frequency corresponds to a particular type of the connected accessory.

17. The apparatus of claim 1, further comprising:
  an audio processor coupled to the interface unit, the audio processor configured to output audio signals generated in the electronic device,
  wherein the audio processor is configured to perform at least one of:
  output a sound effect to indicate that the accessory is connected, and
  change a path of an output of audio signals when the accessory is connected.

18. The method of claim 9, further comprising:
  outputting, by an audio processor coupled to the interface unit, audio signals generated in the electronic device, and
  performing at least one of outputting a sound effect to indicate that the accessory is connected and changing a path of an output of audio signals when the accessory is connected.

19. The apparatus of claim 16, further comprising:
  an audio processor coupled to the interface unit, the audio processor configured to output audio signals generated in the electronic device,
  wherein the audio processor is configured to perform at least one of:
  output a sound effect to indicate that the accessory is connected, and
  change a path of an output of audio signals when the accessory is connected.

* * * * *